United States Patent
Tseng et al.

(10) Patent No.: US 8,164,290 B2
(45) Date of Patent: Apr. 24, 2012

(54) FAN AND MOTOR CONTROL DEVICE

(75) Inventors: Wei-Shuo Tseng, Taoyuan Hsien (TW);
Chia-Pin Wei, Taoyuan Hsien (TW);
Chih-Hsiang Kuo, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 335 days.

(21) Appl. No.: 12/578,788

(22) Filed: Oct. 14, 2009

(65) Prior Publication Data
US 2010/0134054 A1    Jun. 3, 2010

(30) Foreign Application Priority Data
Nov. 28, 2008    (TW) .............................. 97146380 A

(51) Int. Cl.
*H02P 6/00*    (2006.01)

(52) U.S. Cl. .............. 318/400.3; 323/283; 323/282; 323/222; 318/461; 318/400.04; 307/48; 307/51

(58) Field of Classification Search ............... 318/431, 318/400.3; 307/116, 44, 125, 45; 323/282; 363/97
See application file for complete search history.

(56) References Cited

U.S. PATENT DOCUMENTS

| | | | | |
|---|---|---|---|---|
| 6,781,352 B2* | 8/2004 | Athari et al. | ......... | 323/222 |
| 6,801,023 B2* | 10/2004 | Wu et al. | ......... | 323/222 |
| 7,515,444 B2* | 4/2009 | Chen | ......... | 363/97 |
| 2004/0160128 A1* | 8/2004 | Athari | ......... | 307/44 |

* cited by examiner

*Primary Examiner* — Walter Benson
*Assistant Examiner* — Jorge Carrasquillo
(74) *Attorney, Agent, or Firm* — Muncy, Geissler, Olds & Lowe, PLLC

(57) ABSTRACT

A fan includes a motor control device which is electrically connected with a motor and an alternating current power source. The motor control device includes a converting circuit, a power factor correction circuit and a motor controlling circuit. The voltage of the alternating current power source is converted to be direct current voltage by the converting circuit and the power factor correction circuit, and then the direct current voltage is outputted to the motor control circuit. The motor controlling circuit generates a driving signal in accordance with the direct current voltage for driving the motor to operate.

19 Claims, 3 Drawing Sheets

FAN AND MOTOR CONTROL DEVICE

CROSS REFERENCE TO RELATED APPLICATIONS

This Non-provisional application claims priority under 35 U.S.C. §119(a) on Patent Application No(s). 097146380, filed in Taiwan, Republic of China on Nov. 28, 2008, the entire contents of which are hereby incorporated by reference.

BACKGROUND OF THE INVENTION

1. Field of Invention

The present invention relates to a fan and a motor control device, and in particular to a fan and a motor control device which drives a motor to operate via a voltage signal provided by a power factor correction circuit or via a pulse-width modulation signal and the voltage signal provided by the power factor correction circuit.

2. Related Art

Since the environmental protection regulations of every country have been rigid day by day, the trend of developing the driver of brushless DC motor is towards energy saving and superior quality of power source. Therefore, a power factor correction (PFC) circuit is normally disposed in the motor system for enhancing the quality of power source, reducing the harmonics of the motor system and reducing meaningless consumption (reactive power) of power source, so as to enhance the efficacy of the motor.

Please refer to FIG. 1, which shows a conventional brushless DC motor 54 which has the function of power factor correction. An alternating current power source 51 is commutated by a commutating circuit 52 (such as a bridge circuit) and then converted to be a direct current voltage $V_{DC}$ by a PFC circuit 53, so that the direct current voltage $V_{DC}$ works as a driving voltage for the brushless DC motor 54. However, the direct current voltage $V_{DC}$ is a constant value, i.e., the voltage level of the direct current voltage $V_{DC}$ can not be regulated. In addition, the only way of changing the rotational speed of the brushless DC motor 54 is through the pulse width modulation (PWM) signal provided by the motor controlling circuit 55, but if the rotational speed of the brushless DC motor 54 is regulated solely by the PWM signal, the noise caused by shifting in the electronic elements of the brushless DC motor 54 and the consumption of the motor controlling circuit 55 are both increased.

SUMMARY OF THE INVENTION

One objective of the present invention is to provide a motor control device with a power factor correction circuit capable of reducing harmonics and reactive power generated by a motor and controlling the rotational speed of the motor through a regulable voltage level provided by the power factor correction circuit, so as to decrease the noise generated by shifting in the electronic elements of a brushless DC motor and decrease the consumption caused by shifting in the electronic elements.

Another objective of the present invention is to provide a motor control device with a power factor correction circuit which can be closed for reducing the consumption of a motor while the motor is idling or in light load.

To achieve the above, the present invention discloses a motor control device, which is electrically connected with a motor and an alternating current power source. The motor control device includes a converting circuit, a step-up unit, a first voltage detecting unit, a second voltage detecting unit and a motor controlling circuit. The converting circuit is electrically connected with the alternating current power source, and the converting circuit receives a voltage of the alternating current power source and converts the voltage of the alternating current power source to be a voltage of direct current which is defined as a first voltage, then the first voltage is outputted by the converting circuit. The step-up unit is electrically connected with the converting circuit for receiving the first voltage and generating a second voltage according to the first voltage. The first voltage detecting unit is electrically connected with the converting circuit for detecting the first voltage and outputting a first voltage reference signal according to the first voltage. The second voltage detecting unit is electrically connected with the step-up unit for detecting the second voltage and outputting a second voltage reference signal according to the second voltage. The motor controlling circuit is electrically connected with the motor, the first voltage detecting unit and the second voltage detecting unit, respectively. The motor controlling circuit receives the first voltage reference signal and the second voltage reference signal from the first voltage detecting unit and the second voltage detecting unit and calculates the difference between the first voltage reference signal and the second voltage reference signal. The motor controlling circuit generates a driving signal according to the second voltage reference signal for driving the motor to operate when the difference between the first voltage reference signal and the second voltage reference signal exceeds a predetermined voltage value built-in the motor controlling circuit. On the contrary, when the difference between the first voltage reference signal and the second voltage reference signal is lower than the predetermined voltage value, the motor controlling circuit generates a pulse-width modulation signal, and the driving signal is generated by the motor controlling circuit according to the pulse-width modulation signal and the second voltage reference signal for driving the motor to operate.

The above-mentioned motor controlling circuit includes a pulse-width modulation signal generating unit, a processing unit and a driving unit. The processing unit is electrically connected with the first voltage detecting unit, the second voltage detecting unit and the pulse-width modulation signal generating unit, respectively. The first voltage reference signal and the second voltage reference signal are received by the processing unit, and the predetermined voltage value is built-in the processing unit, and the difference between the first voltage reference signal and the second voltage reference signal is calculated by the processing unit. When the difference between the first voltage reference signal and the second voltage reference signal exceeds the predetermined voltage value, the processing unit generates the driving signal according to the second voltage reference signal for driving the motor to operate; when the difference between the first voltage reference signal and the second voltage reference signal is lower than the predetermined voltage value, the pulse-width modulation signal generating unit outputs the pulse-width modulation signal to the processing unit, and the processing unit generates the driving signal according to the pulse-width modulation signal and the second voltage reference signal for driving the motor to operate. The driving unit is electrically connected with the motor and the processing unit respectively, and the driving unit receives the driving signal and drives the motor to operate according to the driving signal.

The above-mentioned motor control device further includes a voltage regulating unit and a controlling unit. The voltage regulating unit is electrically connected with the step-up unit for regulating the second voltage. The controlling unit is electrically connected with the voltage regulating unit and the processing unit, and when the controlling unit receives a first controlling signal outputted by the processing unit, the controlling unit regulates the second voltage through the voltage regulating unit. Or, the processing unit can output the first controlling signal to the voltage regulating unit to regulate the second voltage directly, so as to regulate the rotational speed of the motor.

The described above motor control device further includes a current detecting unit and an arithmetic unit. The current detecting unit is electrically connected with the converting circuit for detecting a current of a terminal of the converting circuit and outputting a current detecting signal. The arithmetic unit is electrically connected with the current detecting unit, the second voltage detecting unit and the processing unit, respectively. The arithmetic unit receives the current detecting signal and the second voltage reference signal from the current detecting unit and the second voltage detecting unit, and a power consumption value of the motor is figured out by the arithmetic unit according to the current detecting signal and the second voltage reference signal, then, the arithmetic unit outputs the power consumption value to the processing unit. The processing unit has a predetermined power value, and the power consumption value is compared with the predetermined power value by the processing unit, when the power consumption value is lower than the predetermined power value, the processing unit outputs a second controlling signal to the controlling unit. When the second controlling signal is received by the controlling unit, the controlling unit stops running by a switching unit, and in the meantime, the driving signal is generated by the processing unit according to the pulse-width modulation signal and the second voltage reference signal, then the processing unit outputs the driving signal to the driving unit for driving the motor to operate.

BRIEF DESCRIPTION OF THE DRAWINGS

The present invention will be fully understood from the subsequent detailed description and accompanying drawings, which are given by way of illustration only, and thus are not limitative of the present invention, and wherein.

DETAILED DESCRIPTION OF THE INVENTION

The preferred embodiments of a fan and motor control device of the present invention will be apparent from the following detailed description, which proceeds with reference to the accompanying drawings.

The fan of the present invention includes an impeller, a motor and a motor control device. The motor is connected with the impeller for rotating the impeller. The motor control device is used for driving the motor to operate.

Figure 1:
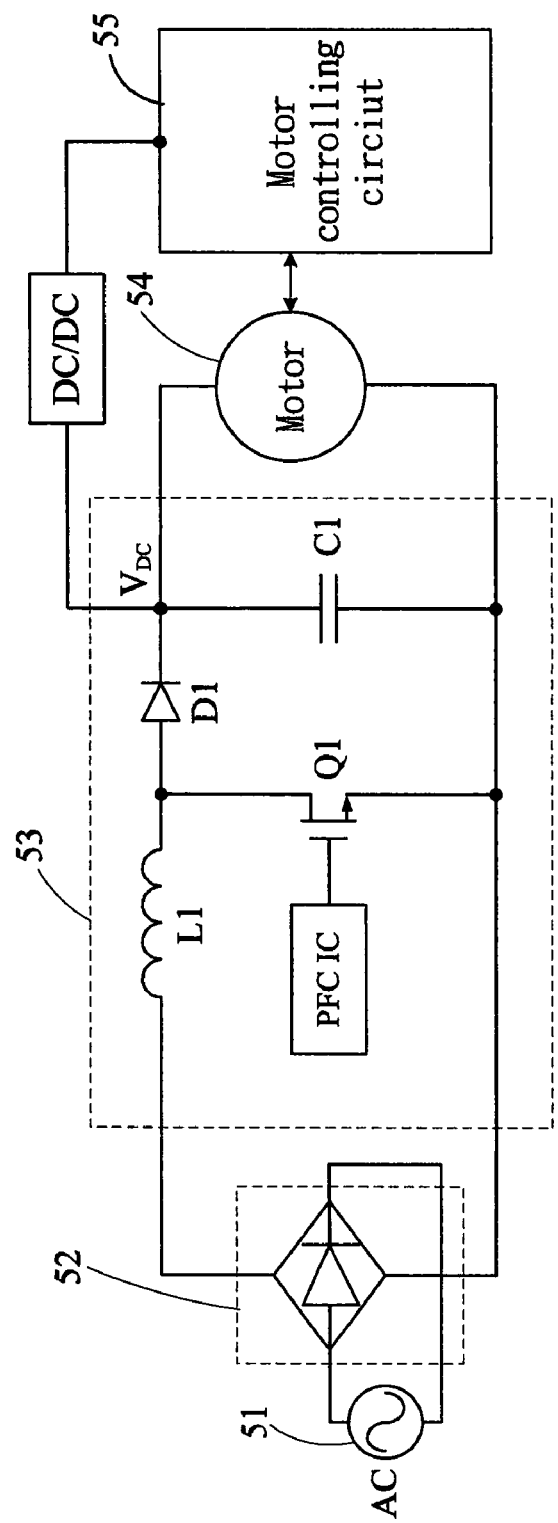
FIG. 1 is a circuit block diagram of a conventional motor control device electrically connected with a motor and an alternating current power source.
Figure 2:
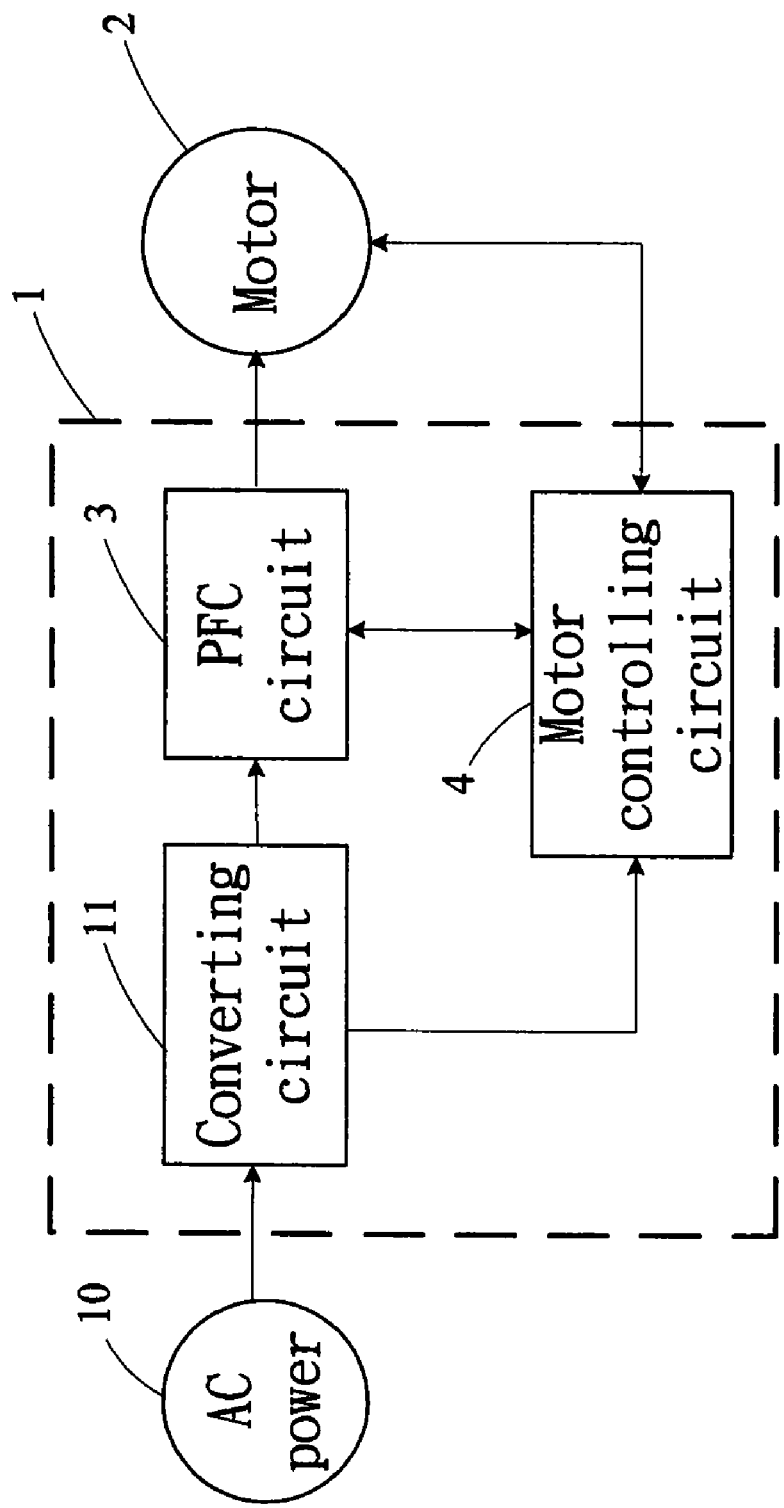
FIG. 2 is a schematic circuit block diagram of a motor control device electrically connected with a motor and an alternating current power source according to the preferred embodiment of the present invention.
Figure 3:
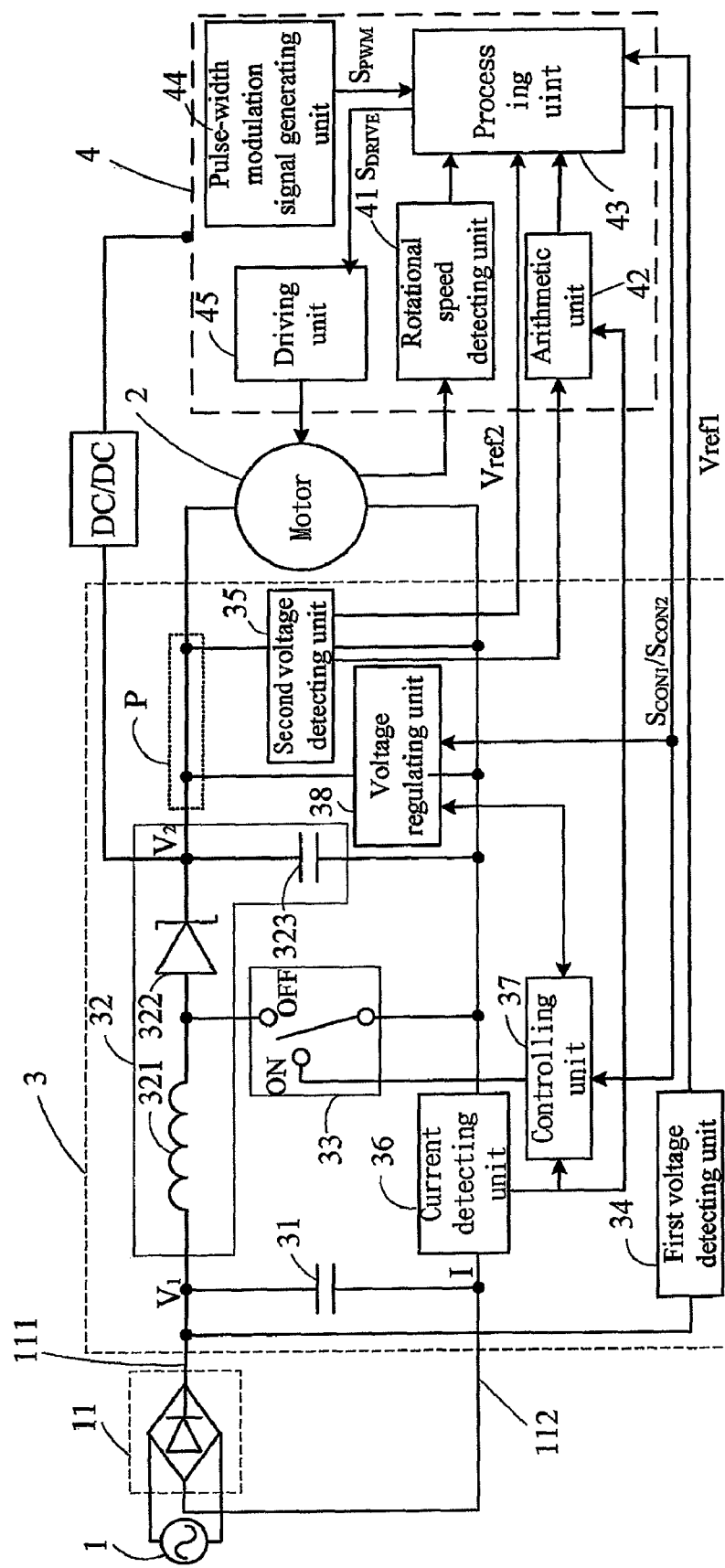
FIG. 3 is a circuit block diagram of a motor control device electrically connected with a motor and an alternating current power source according to the preferred embodiment of the present invention.

Please refer to FIG. 2 and FIG. 3, the motor control device 1 of the present invention is electrically connected with an alternating current power source 10 and the motor 2, respectively. The motor control device 1 includes a converting circuit 11, a power factor correction (PFC) circuit 3 and a motor controlling circuit 4. The converting circuit 11 is electrically connected with the alternating current power source 10. The power factor correction circuit 3 is electrically connected with the converting circuit 11, the motor 2 and the motor controlling circuit 4, respectively. The motor controlling circuit 4 is electrically connected with the power factor correction circuit 3 and the motor 2, respectively.

The motor controlling circuit 4 includes a rotational speed detecting unit 41 (such as a hall element), an arithmetic unit 42 (such as an integrator), a processing unit 43, a pulse-width modulation signal generating unit 44 and a driving unit 45. The processing unit 43 is electrically connected with the rotational speed detecting unit 41, the arithmetic unit 42, the pulse-width modulation signal generating unit 44 and the driving unit 45, respectively. The driving unit 45 and the rotational speed detecting unit 41 are electrically connected with the motor 2, respectively. Nevertheless, the present invention is not limited thereto, for example, the arithmetic unit 42 can be integrated in the processing unit 43.

The power factor correction circuit 3 includes a first capacitor 31, a step-up unit 32 (which includes an inductor 321, a diode 322 and a second capacitor 323), a switching unit 33, a first voltage detecting unit 34, a second voltage detecting unit 35, a current detecting unit 36, a controlling unit 37 and a voltage regulating unit 38. The controlling unit 37 can be, for example, a PFC IC.

The input terminal of the converting circuit 11 is electrically connected with the alternating current power source 10, and the converting circuit 11 has a first terminal 111 and a second terminal 112. The first terminal 111 is electrically connected with a terminal of the step-up unit 32, the first voltage detecting unit 34 and a terminal of the first capacitor 31, respectively. The second terminal 112 is electrically connected with another terminal of the first capacitor 31 and the current detecting unit 36 respectively, and the current detecting unit 36 is further electrically connected with the controlling unit 37 and the arithmetic unit 42 of the motor controlling circuit 4, respectively. The first voltage detecting unit 34 is electrically connected with the processing unit 43 of the motor controlling circuit 4. The step-up unit 32 is electrically connected with a first end (off) of the switching unit 33, a second end of the switching unit 33 and a mutual terminal P, respectively. The mutual terminal P is electrically connected with the voltage regulating unit 38, the second voltage detecting unit 35 and the motor 2, respectively. The second voltage detecting unit 35 is electrically connected with the second capacitor 323 of the step-up unit 32, the second end of the switching unit 33, the current detecting unit 36, the arithmetic unit 42 and the processing unit 43 of the motor controlling circuit 4, respectively. The voltage regulating unit 38 is electrically connected with the processing unit 43 of the motor controlling circuit 4. The controlling unit 37 is electrically connected with a third end (on) of the switching unit 33 (which is marked "on" in the FIG. 3), the voltage regulating unit 38, the arithmetic unit 42 and the processing unit 43 of the motor controlling circuit 4, respectively. Nevertheless, in other embodiments, one or all of the voltage regulating unit 38, the second voltage detecting unit 35 and the current detecting unit 36 can be integrated in the processing unit 43.

In this embodiment, the converting circuit 11 receives a voltage of the alternating current power source 10 and converts the voltage of the alternating current power source 10 to be a voltage of direct current which is defined as a first voltage $V_1$, and then the first voltage $V_1$ is outputted to the step-up unit 32 by the converting circuit 11. The step-up unit 32 steps up the first voltage $V_1$ to be a second voltage $V_2$ and outputs the second voltage $V_2$ to the mutual terminal P, and the second voltage $V_2$ is kept to be greater than or equal to the first voltage $V_1$.

The first voltage detecting unit 34 detects the first voltage $V_1$ generated by the converting circuit 11 and generates a first voltage reference signal $V_{ref1}$, then the first voltage detecting unit 34 outputs the first voltage reference signal $V_{ref1}$ to the processing unit 43 of the motor controlling circuit 4.

The second voltage detecting unit 35 detects the second voltage $V_2$ at the mutual terminal P and generates a second voltage reference signal $V_{ref2}$, and then the second voltage detecting unit 35 outputs the second voltage reference signal $V_{ref2}$ to the processing unit 43 of the motor controlling circuit 4.

A predetermined voltage value is built-in the processing unit 43. The processing unit 43 receives the first voltage reference signal $V_{ref1}$ and the second voltage reference signal $V_{ref2}$ from the first voltage detecting unit 34 and the second voltage detecting unit 35 and calculates the difference between the first voltage reference signal $V_{ref1}$ and the second voltage reference signal $V_{ref2}$. When the difference between the first voltage reference signal $V_{ref1}$ and the second voltage reference signal $V_{ref2}$ exceeds the predetermined voltage value, the processing unit 43 generates a driving signal $S_{DRIVE}$ according to the second voltage reference signal $V_{ref2}$ for driving the motor 2 to operate. When the difference between the first voltage reference signal $V_{ref1}$ and the second voltage reference signal $V_{ref2}$ is lower than the predetermined voltage value, the pulse-width modulation signal generating unit 44 generates a pulse-width modulation signal $S_{PWM}$ and outputs the pulse-width modulation signal $S_{PWM}$ to the processing unit 43, then the processing unit 43 generates the driving signal $S_{DRIVE}$ according to the pulse-width modulation signal $S_{PWM}$ and the second voltage reference signal $V_{ref2}$ for driving the motor 2 to operate. In this embodiment, the first voltage $V_1$ and the first voltage reference signal $V_{ref1}$ are proportionable, and the second voltage $V_2$ and the second voltage reference signal $V_{ref2}$ are also proportionable.

In the second condition described above (when the difference between the first voltage reference signal $V_{ref1}$ and the second voltage reference signal $V_{ref2}$ is lower than the predetermined voltage value), the processing unit 43 can output a first controlling signal $S_{CON1}$ to the controlling unit 37, and then the controlling unit 37 regulates the second voltage $V_2$ through the voltage regulating unit 38. Or, the processing unit 43 can output the first controlling signal $S_{CON1}$ to the voltage regulating unit 38 to regulate the second voltage $V_2$ directly. Because the second voltage $V_2$ is regulated and is detected by the second voltage detecting unit 35, the second voltage reference signal $V_{ref2}$ generated by the second voltage detecting unit 35 will also be changed. Therefore, the difference between the first voltage reference signal $V_{ref1}$ and the second voltage reference signal $V_{ref2}$ can exceed the predetermined voltage value again, and the processing unit 43 will generate the driving signal $S_{DRIVE}$ according to the second voltage reference signal $V_{ref2}$ again for driving the motor 2 to operate. In the meantime, the rotational speed of the motor 2 can also be regulated by regulating the second voltage $V_2$ at the mutual terminal P through the voltage regulating unit 38.

The current detecting unit 36 detects the current I at the second terminal 112 of the converting circuit 11, then the current detecting unit 36 outputs a current detecting signal to the controlling unit 37 and the arithmetic unit 42 of the motor controlling circuit 4. The arithmetic unit 42 not only receives the current detecting signal, but also receives the second voltage reference signal $V_{ref2}$ from the second voltage detecting unit 35. Then a power consumption value W of the motor 2 is figured out by the arithmetic unit 42 according to the current detecting signal and the second voltage reference signal $V_{ref2}$, and the power consumption value W is outputted to the processing unit 43 by the arithmetic unit 42. The processing unit 43 has a predetermined power value, and the power consumption value W is compared with the predetermined power value by the processing unit 43. When the power consumption value W is lower than the predetermined power value, it represents the motor 2 is idling or in light load. On the contrary, when the power consumption value W is greater than the predetermined power value, it represents the motor 2 is overloaded. When the motor 2 is idling or in light load, the power consumption value W of the motor 2 is very low, and it does not matter that how many harmonics and reactive power generated by the motor 2, so that the power factor correction circuit 3 should be closed for reducing its consumption. In the present invention, when the power consumption value W is lower than the predetermined power value, the processing unit 43 outputs a second controlling signal $S_{CON2}$ to the controlling unit 37, and then the controlling unit 37 switches off the switching unit 33, so as to stop the power factor correction circuit 3. In the meantime, the processing unit 43 generates the driving signal $S_{DRIVE}$ according to the pulse-width modulation signal $S_{PWM}$ and the second voltage reference signal $V_{ref2}$ for driving the motor 2 to operate.

In this embodiment, the processing unit 43 can be a microprocessor or a microcontroller. The driving unit 45 is a driving circuit of brushless DC motor and includes a full-bridge circuit or a half-bridge circuit. After the driving unit 45 receives the driving signal $S_{DRIVE}$ outputted by the processing unit 43, the driving unit 45 drives the motor 2 to operate.

In summary, the power factor correction circuit 3 of the motor control device 1 of the present invention not only reduces harmonics and reactive power generated by the motor 2, but also provides a regulable voltage level (i.e. the second voltage $V_2$) for controlling the rotational speed of the motor 2. So that the noise generated by shift in electronic elements of a conventional brushless DC motor and the consumption caused by shift in the electronic elements when the operation of the motor is regulated solely by a pulse width modulation signal can be decreased. Furthermore, when the motor 2 is idling or in light load, the power consumption value W of the motor 2 is very low, so that the power factor correction circuit 3 is closed in the present invention and the rotational speed of the motor 2 is controlled by the second voltage reference signal $V_{ref2}$ and the pulse-width modulation signal $S_{PWM}$ generated by the motor controlling circuit 4, naturally, the consumption of the power factor correction circuit 3 can be reduced.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor control device, which is electrically connected with a motor and an alternating current power source, the motor control device comprising:

a converting circuit electrically connected with the alternating current power source, wherein the converting circuit receives a voltage of the alternating current power source and converts the voltage of the alternating current power source to be a voltage of direct current which is defined as a first voltage, and then the first voltage is outputted by the converting circuit;

a step-up unit electrically connected with the converting circuit for receiving the first voltage and generating a second voltage according to the first voltage;

a first voltage detecting unit electrically connected with the converting circuit for detecting the first voltage and outputting a first voltage reference signal according to the first voltage;

a second voltage detecting unit electrically connected with the step-up unit for detecting the second voltage and outputting a second voltage reference signal according to the second voltage; and a motor controlling circuit electrically connected with the motor, the first voltage detecting unit and the second voltage detecting unit, respectively, the motor controlling circuit being for receiving the first voltage reference signal and the second voltage reference signal from the first voltage detecting unit and the second voltage detecting unit and calculating the difference between the first voltage reference signal and the second voltage reference signal, and the motor controlling circuit generates a driving signal according to the second voltage reference signal for driving the motor to operate when the difference between the first voltage reference signal and the second voltage reference signal exceeds a predetermined voltage value built-in the motor controlling circuit.

2. The motor control device according to claim 1, wherein when the difference between the first voltage reference signal and the second voltage reference signal calculated by the motor controlling circuit is lower than the predetermined voltage value of the motor controlling circuit, the motor controlling circuit generates a pulse-width modulation signal, and the driving signal is generated by the motor controlling circuit according to the pulse-width modulation signal and the second voltage reference signal.

3. The motor control device according to claim 1, wherein the second voltage is greater than or equal to the first voltage.

4. The motor control device according to claim 1, wherein the motor controlling circuit comprises:

a pulse-width modulation signal generating unit for generating a pulse-width modulation signal;

a processing unit electrically connected with the first voltage detecting unit, the second voltage detecting unit and the pulse-width modulation signal generating unit, respectively; wherein the first voltage reference signal and the second voltage reference signal are received by the processing unit, and the predetermined voltage value is built-in the processing unit, and the difference between the first voltage reference signal and the second voltage reference signal is calculated by the processing unit; when the difference between the first voltage reference signal and the second voltage reference signal exceeds the predetermined voltage value, the processing unit generates the driving signal according to the second voltage reference signal for driving the motor to operate; when the difference between the first voltage reference signal and the second voltage reference signal is lower than the predetermined voltage value, the pulse-width modulation signal generating unit outputs the pulse-width modulation signal to the processing unit, and the processing unit generates the driving signal according to the pulse-width modulation signal and the second voltage reference signal for driving the motor to operate; and a driving unit electrically connected with the motor and the processing unit respectively, the driving unit being for receiving the driving signal and driving the motor to operate according to the driving signal.

5. The motor control device according to claim 4, wherein the processing unit is a microprocessor or a microcontroller.

6. The motor control device according to claim 4, wherein the driving unit is a driving circuit of brushless DC motor comprising a full-bridge circuit or a half-bridge circuit.

7. The motor control device according to claim 4, further comprising:

a voltage regulating unit electrically connected with the step-up unit for regulating the second voltage; and a controlling unit electrically connected with the voltage regulating unit and the processing unit, and when the controlling unit receives a first controlling signal outputted by the processing unit, the controlling unit regulates the second voltage through the voltage regulating unit, so as to regulate the rotational speed of the motor.

8. The motor control device according to claim 7, wherein the second voltage detecting unit is integrated in the controlling unit.

9. The motor control device according to claim 7, wherein the processing unit outputs the first controlling signal to the voltage regulating unit for regulating the second voltage through the voltage regulating unit, so as to regulate the rotational speed of the motor.

10. The motor control device according to claim 7, wherein the voltage regulating unit is integrated in the controlling unit.

11. The motor control device according to claim 7, further comprising a current detecting unit electrically connected with the converting circuit for detecting a current of a terminal of the converting circuit and outputting a current detecting signal.

12. The motor control device according to claim 11, wherein the current detecting unit is integrated in the controlling unit.

13. The motor control device according to claim 11, wherein the motor controlling circuit further comprises an arithmetic unit electrically connected with the current detecting unit, the second voltage detecting unit and the processing unit, respectively, the arithmetic unit being for receiving the current detecting signal and the second voltage reference signal from the current detecting unit and the second voltage detecting unit, and a power consumption value of the motor is figured out by the arithmetic unit according to the current detecting signal and the second voltage reference signal, nd then the arithmetic unit outputs the power consumption value to the processing unit.

14. The motor control device according to claim 13, wherein the arithmetic unit is integrated in the processing unit.

15. The motor control device according to claim 13, wherein the arithmetic unit is an integrator.

16. The motor control device according to claim 13, wherein the processing unit comprises a predetermined power value, and the power consumption value is compared with the predetermined power value by the processing unit, when the power consumption value is lower than the predetermined power value, the processing unit outputs a second controlling signal to the controlling unit, and the driving signal is generated by the processing unit according to the pulse-width modulation signal and the second voltage reference signal, then the processing unit outputs the driving signal to the driving unit for driving the motor to operate.

17. The motor control device according to claim 16, wherein the controlling unit stops running when the second controlling signal is received by the controlling unit.

18. The motor control device according to claim 17, further comprising a switching unit electrically connected with the controlling unit, and the controlling unit stops running when the switching unit is switched off.

19. A fan, comprising:

an impeller:

a motor connected with the impeller for rotating the impeller; and a motor control device electrically connected with the motor and an alternating current power source for driving the motor to operate, the motor control device comprising:

a converting circuit electrically connected with the alternating current power source, wherein the converting circuit receives a voltage of the alternating current power source and converts the voltage of the alternating current power source to be a voltage of direct current which is defined as a first voltage, and then the first voltage is outputted by the converting circuit;

a step-up unit electrically connected with the converting circuit for receiving the first voltage and generating a second voltage according to the first voltage;

a first voltage detecting unit electrically connected with the converting circuit for detecting the first voltage and outputting a first voltage reference signal according to the first voltage;

a second voltage detecting unit electrically connected with the step-up unit for detecting the second voltage and outputting a second voltage reference signal according to the second voltage; and a motor controlling circuit electrically connected with the motor, the first voltage detecting unit and the second voltage detecting unit, respectively, the motor controlling circuit being for receiving the first voltage reference signal and the second voltage reference signal from the first voltage detecting unit and the second voltage detecting unit and calculating the difference between the first voltage reference signal and the second voltage reference signal, and the motor controlling circuit generates a driving signal according to the second voltage reference signal for driving the motor to operate when the difference between the first voltage reference signal and the second voltage reference signal exceeds a predetermined voltage value built-in the motor controlling circuit.

* * * * *